United States Patent [19]

Hirota

[11] Patent Number: 5,156,578
[45] Date of Patent: Oct. 20, 1992

[54] DIFFERENTIAL GEAR DEVICE FOR VEHICLE

[75] Inventor: Isao Hirota, Tochigi, Japan

[73] Assignee: Tochigifujisangyo Kabushiki Kaisha, Tochigi, Japan

[21] Appl. No.: 710,545

[22] Filed: Jun. 5, 1991

[30] Foreign Application Priority Data

Jun. 5, 1990 [JP] Japan .................... 2-58764[U]

[51] Int. Cl.⁵ .............................................. F16H 1/44
[52] U.S. Cl. .................... 475/150; 475/249; 475/252; 475/84
[58] Field of Search ............. 475/85, 89, 150, 249, 475/252

[56] References Cited

U.S. PATENT DOCUMENTS

| | | | |
|---|---|---|---|
| 4,733,577 | 3/1988 | Griesser et al. | 475/150 |
| 4,781,078 | 11/1988 | Blessing et al. | 475/252 X |
| 4,860,612 | 8/1989 | Dick et al. | 475/150 X |
| 4,895,236 | 1/1990 | Sakakibara et al. | 475/150 X |
| 4,989,686 | 2/1991 | Miller et al. | 475/150 X |
| 5,006,098 | 4/1991 | Yoshinaka et al. | 475/252 X |
| 5,019,021 | 5/1991 | Janson | 475/150 |
| 5,030,181 | 7/1991 | Keller | 475/150 |

OTHER PUBLICATIONS

Japanese laid Open Publication No. 63-195449 (corresponding to U.S. Pat. No. 4,781,078).

*Primary Examiner*—Rodney H. Bonck
*Assistant Examiner*—Daniel Wittels
*Attorney, Agent, or Firm*—Graham & James

[57] ABSTRACT

A differential gear device for a vehicle is disclosed. The differential gear device is provided with a planetary gearing for producing differential motion having a ring gear with an tooth portion, and a electro-magnetic multiple clutch for limiting the differential motion. The electromagnetic clutch is provided with a plurality of outer friction plates and a plurality of inner friction plates alternately positioned with the outer friction plates. An outer rotary member made of a nonmagnetic substance and integrally joined to the ring gear is provided for the electro-magnetic multiple clutch. The outer rotary member is provided with a tooth portion for engaging the outer friction plates. The tooth portion of the outer rotary member is formed to receive the outer friction plates from the tooth portion side of the ring gear and has an aperture at least larger than the thickness of one outer friction plate at the tooth portion of the ring gear. The electromagnetic clutch is provided with an inner rotary member with tooth portion for engaging the inner friction plates and a electromagnet for causing frictional engagement of the outer and inner friction plates.

4 Claims, 3 Drawing Sheets

DIFFERENTIAL GEAR DEVICE FOR VEHICLE

BACKGROUND OF THE INVENTION

1. Field of the Invention

This invention relates to a differential gear device for a vehicle and more particularly to a differential gear device with a limited slip differential device.

2. Description of the Prior Art

Conventional differential gear devices for a vehicle, for example as disclosed in Japanese Laid Open Patent Publication No. 63-195449 (U.S. Pat. No. 4,781,078), includes a device with a planetary gearing. The planetary gearing is generally provided with a sun gear for engaging planet gears which rotate and revolve on the sun gear and a ring gear for engaging the planet gears and rotating around the planet gears. The planet gears are respectively supported by a planet carrier. Driving force from an engine is input to the ring gear, and the planet carrier or the sun gear outputs the driving force to the right axle or to the left axle.

In this configuration, when a difference in the rate of rotation occurs between the right and left axles, this difference is absorbed by the planetary gearing and the driving force can be properly output to the right and left axles. As a result, when turning a corner, even when a difference in the rate of rotation occurs between the right and left axles, a smooth drive is possible.

However, when a wheel on one side encounters snow, ice or mud and spins, the driving force is spent on the spinning wheel and the vehicle cannot move. Therefore, limited slip differential devices (LSD) for limiting the difference in rotation has been developed. The device of the above Patent uses a multiple disc clutch as a device for limiting the differential motion.

SUMMARY OF THE INVENTION

An object of the present invention is to provide a differential gear device for a vehicle into which friction plates can be easily inserted and assembled without precise joining.

This and other objects can be achieved according to this invention by providing a differential gear device for a vehicle, comprising: (a) a planetary gearing for producing a differential motion, including a ring gear with a tooth portion; and (b) an electro-magnetic multiple clutch for limiting the differential motion, including (1) a plurality of outer friction plates, (2) a plurality of inner friction plates alternately positioned with the outer friction plates, (3) an outer rotary member made of a nonmagnetic substance, integrally joined to the ring gear and provided with a tooth portion for engaging the outer friction plates, the tooth portion of said outer rotary member formed to receive the outer friction plates from the tooth portion side of the ring gear and having an aperture at least larger than the thickness of one outer friction plate at the tooth portion of the ring gear, (4) an inner rotary member with tooth portion for engaging the inner friction plates; and (5) an electro-magnet for engaging the outer and inner friction plates.

DETAILED DESCRIPTION OF THE PREFERRED EMBODIMENTS

Figure 1:
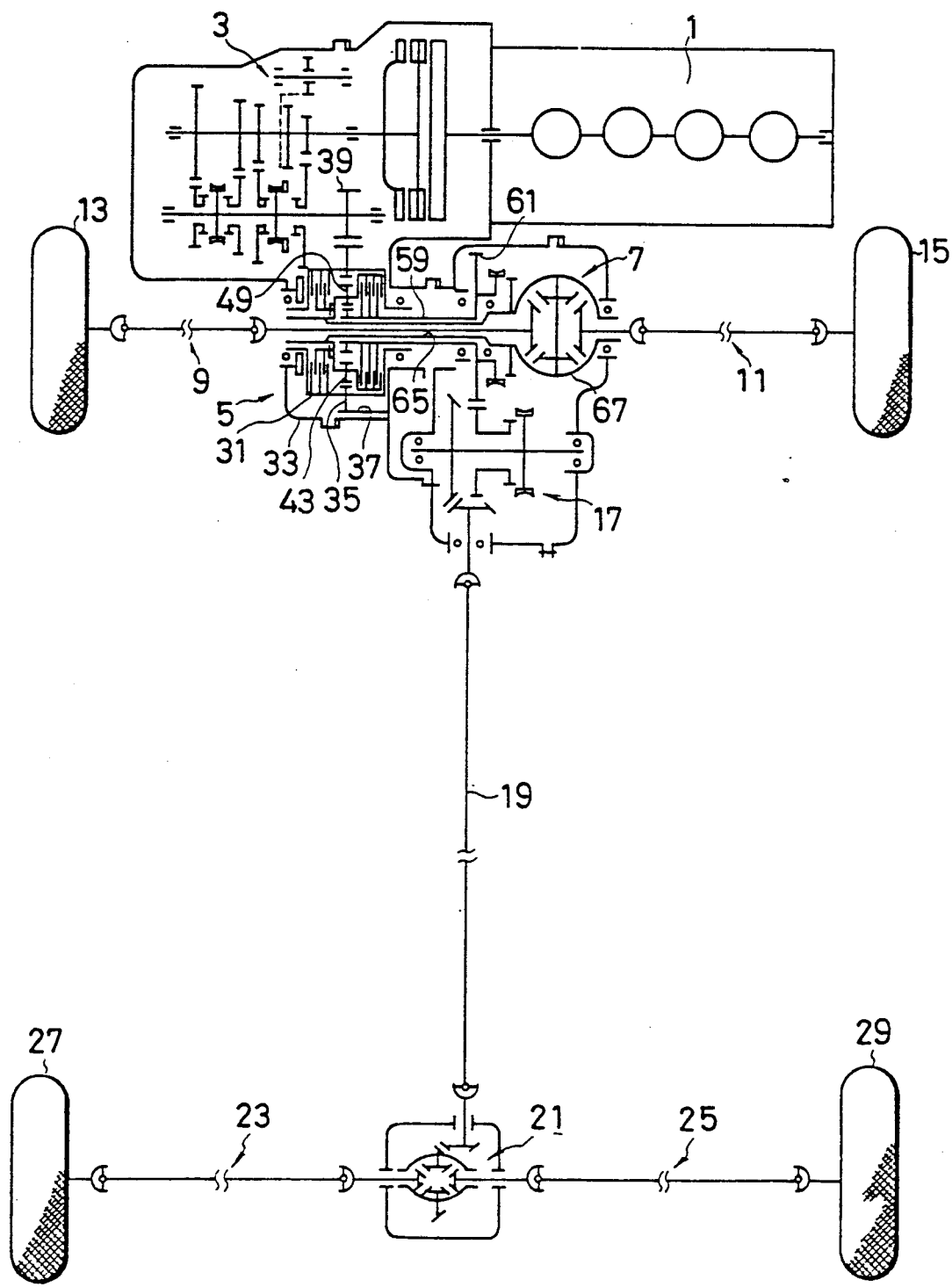
FIG. 1 shows a schematic view of a power system of a vehicle with an embodiment of a differential gear device according to the present invention.

Referring FIG. 1, a power system of a vehicle comprises an engine 1, a transmission 3, a center differential gear device (a differential gear device between the front and rear axles) 5, a front differential gear device (a differential gear device on the front axle side) 7, a plurality of front axles 9, 11, a right and a left front wheels 13, 15, a gear device for changing direction 17, a propeller shaft 19, a rear differential gear device (a differential gear device on the rear axle side) 21, a plurality of rear axles 23, 25, and a right and a left rear wheel 27, 29, or the like.

Figure 2:
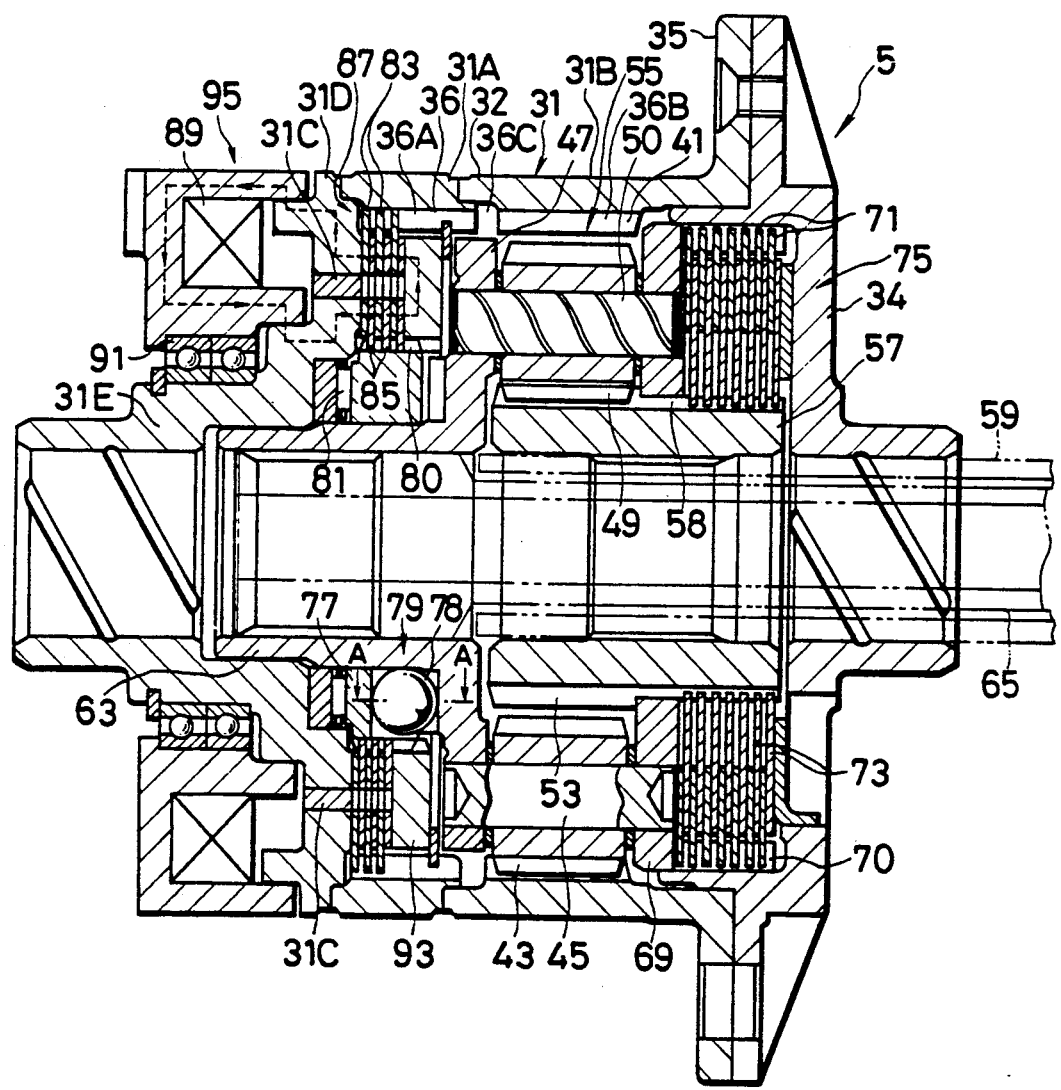
FIG. 2 is a sectional view of the differential gear device of the above embodiment.
Figure 3:
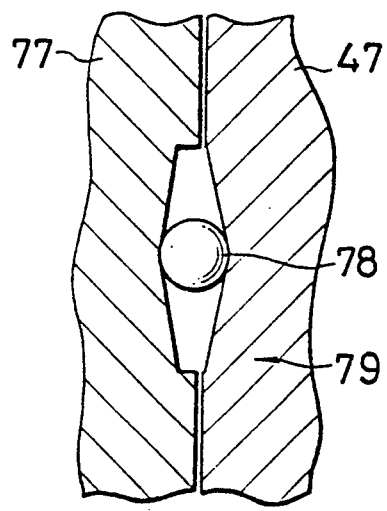
FIG. 3 is a partial sectional view taken along line A—A of FIG. 2.

FIG. 2 shows an differential gear device with a limited slip differential device (LSD) which can provide a large differential limiting force with a small force. A differential casing 31 of the center differential gear device 5 is positioned in a transmission casing 33 in a freely rotatable manner. A flange portion 35 of the differential casing 31 is connected with a ring gear 37 by means of bolts. The ring gear 37 engages a drive gear 39 of the transmission 3.

The differential casing 31 comprises a cylindrical portion 32, and a cover 34 for closing an opening on the right side in the figure of the cylindrical portion 32. The differential casing 31 is provided with an internal gear (ring gear) 41 on the inner side thereof, which engages an outer planet gear 43. The outer planet gear 43 is supported by a pivot shaft 45 in a freely rotatable manner, which is supported by a planet carrier 47. The outer planet gear 43 engages an inner planet gear 49 which is supported by a pivot shaft 50 in a freely rotatable manner and engages a sun gear 53. The pivot shaft 50 is supported by the planet carrier 47. The internal gear 41, planet gears 43, 49, planet carrier 47 and sun gear 53 constitute a planetary gearing 55.

The planet carrier 47 has a boss portion 63 engaging an end of an inner hollow shaft (with an axle on one side) 65 inside thereof by means of splines. The sun gear 53 has a boss portion 57 engaging an end of an outer hollow shaft (with another axle on the other side) 59 thereof by means of splines. The outer hollow shaft 59, as shown in FIG. 1, is connected with the gear device for changing direction 17 through a gear 61 at the other end thereof. The inner hollow shaft 65 is inserted into the outer hollow shaft 59 in a freely rotatable manner and is connected with a differential casing 67 of the front differential gear device 7.

As shown in FIG. 2, on the right side in figure of the planetary gearing 55, a clutch drum 69 is positioned in a manner allowing rotation relative to the differential casing 31. The clutch drum 69 is secured to the right side of the pivot shafts 45, 50 secured to the planet carrier 47. The clutch drum 69 is provided with a tooth portion 70 and a plurality of outer friction plates 71 engage the tooth portion 70 in a manner allowing movement only in the axial direction. A boss portion 57 of the sum gear 53 is provided with a tooth portion 58 and a plurality of inner friction plates 73 engage the tooth portion 58 in a manner allowing movement only in the axial direction. The friction plates 73 are alternately positioned with the friction plates 71 in the axial direction. The clutch drum 69, friction plates 73, 71 and tooth portion 58 of the boss portion 57 constitute a multiple disc clutch 75 for limiting differential motion between the sun gear 53 and the planet carrier 47. When the multiple disc clutch 75 is engaged, the relative rotation between the sun gear 53 and the planet gear 47 is limited to limit the differential motion between the front and rear axles 9, 11, 23, 25.

A cam ring 77 is positioned on the outer peripheral side of the boss portion 63 of the planet carrier 47. A ball 78 is positioned between the cam ring 77 and the planet carrier 47. The cam ring 77, ball 78 and a part of the planet carrier 47 constitute a cam structure 79. A thrust bearing 81 for receiving a thrust reaction force is positioned between the cam ring 77 and the differential casing 31.

A plurality of outer friction plates 83 and a plurality of inner friction plates 85 are alternately positioned in the axial direction between the planet carrier 47 and the differential casing 31. The outer friction plates 83 engage a tooth portion 36A with splines in the inner peripheral portion of the differential casing 31 in a manner allowing movement only in the axial direction. The inner friction plates 85 engage a tooth portion 80 with splines in the outer peripheral portion of the cam ring 77 in a manner allowing movement in the axial direction. The inner and outer friction plates 83, 85, tooth portion 36A of the differential casing 31 and tooth portion of the cam ring 77 constitute a multiple disc clutch 87. An electromagnet 89 is positioned on the outer peripheral side of the differential casing 31 through a bearing 91. A pressure ring 93 for engaging the multiple disc clutch 87 by the magnetic force of the electromagnet 89 is positioned between the multiple disc clutch 87 and the planet carrier 47. The multiple disc clutch 87, electromagnet 89 and pressure ring 93 constitute an electromagnetic multiple clutch 95.

The differential casing 31 comprises a nonmagnetic substance part 31A for engaging the friction plates 83, 85, a magnetic substance part 31B connected to the right side in the figure of the nonmagnetic substance part 31A, a magnetic substance part 31D connected to the left side in the figure of the nonmagnetic substance part 31A, a ringed nonmagnetic substance part 31C connected to the inner peripheral surface of the magnetic substance part 31D, and a magnetic substance part 31E connected to the inner peripheral surface of the nonmagnetic substance part 31C. The nonmagnetic substance part 31A, 31C and magnetic substance part 31B, 31D, 31E are respectively interconnected preferably by welding. The nonmagnetic substance parts 31A, 31C are preferably made of stainless steel and the magnetic substance parts 31B, 31D, 31E are preferably made of chromium molybdenum steel (for example, 34CrMo4, 42CrMo4).

By these nonmagnetic substance part 31A, 31C, most of the line of magnetic force is guided to the friction plates 83, 85 and forms a closed loop (as designated by the broken line in FIG. 2) through the pressure ring 93 without passing the magnetic substance part 31B of the differential casing 31 and short-circuiting. As a result, the friction plates 83, 85 and the pressure ring 93 are efficiently attracted by the electromagnet 89 to produce a large connecting force.

To efficiently attract the friction plates 83, 85, the line of magnetic force must be efficiently guided to the friction plates 83, 85 constituting the multiple disc clutch 87. Therefore, the nonmagnetic substance part 31A is preferably made of stainless steel. However, when the nonmagnetic substance part 31A is connected with the magnetic substance part 31B by welding, if the tooth portion 36A is not properly continuous with the tooth portion 36B at the connecting part, the friction plates 83 cannot be inserted into and engage the tooth portion 36A on assembling. Namely, in a configuration in which the friction plates 83 are inserted from the side of the magnetic substance part 31B, if the tooth portion 36A deviates even a little from the tooth portion 36B in the peripheral direction, the friction plates 83 are caught between the tooth portion 31B and the tooth portion 31A and cannot be inserted into the tooth portion 31A.

Therefore, the tooth portion 36 with splines is provided with an aperture 36C at the connecting part between the nonmagnetic substance part 31A and the magnetic substance part 31B. The dimension of the aperture 36C in the axial direction is at least larger than the thickness of one friction plate 83 to make it possible to insert the friction plate 83 through the aperture 36C from lateral side. As a result, even if the tooth portion 36A of the nonmagnetic substance part 31A deviates from the tooth portion 36B of the magnetic substance part 31B in the peripheral direction, the friction plates 83, 85 can be easily inserted into the tooth portion 36A.

Next, the action of this embodiment will be described.

The rotation of the differential casing 31 by the driving force from the engine 1 is transmitted by the engagement of the planetary gearing 55 from the planet carrier 47 to the front axle 13, 15 and from sun gear 53 to the rear axle 27, 29. In this case, when there is a difference of driving resistance between the front and rear axles 9, 11, 23, 25, the driving force from the engine 1 is differentially distributed to the front axles 9, 11 and the rear axles 23, 25 according to the difference of driving resistance by the relative rotation between the sun gear 53 and the planet carrier 47 by the rotation and the revolution of the planet gear 43, 49.

When the electro-magnetic multiple clutch 95 is engaged, a large differential limitation is provided by the small engaging force of the multiple disc clutch 87 because the cam ring 77 is connected with the planet carrier 47 through the cam structure 79. Namely, when between the front and rear axles, in short between the differential casing 31 and the planet carrier 47, a differential rotational force occurs, the differential rotational force acts on the cam structure 79 to produce a thrust force. The thrust force acts on the multiple disc clutch 75 through the planet carrier 47 and the clutch drum 69 to press the multiple disc clutch 75 to engage the multiple disc clutch 75 and to produce an even larger differential limiting force.

When the electro-magnetic multiple disk clutch 95 is disengaged the cam structure 79 does not produce the thrust force because the cam ring 77 rotates together with the planet carrier 47. As a result, the multiple clutch 75 is disengaged to release the differential rotation. The electro-magnetic multiple disc clutch 95 is constructed to be manually operated from the driver's seat as in the above operation or to be automatically operated according to the steering conditions and the condition of the surface of the road.

The function of this center differential device 5 will now be described with reference to the vehicle in FIG. 1.

When the electro-magnetic multiple disc clutch 95 is disconnected, the center differential device 5 allows free differential motion between the front and rear axles to make the vehicle turn smoothly to prevent the tight corner braking phenomenon. When the electro-magnetic multiple disc clutch 95 is engaged, the center differential device 5 limits the differential motion between the front and rear axles according to the engaging force. Therefore, even if one side of the front wheel 13, 15 or the rear wheel 27, 29 slip because of a bad road conditions or the like, because the driving force is transmitted to the other wheel by the torque transmission by the differential limitation, the vehicle can avoid being mired because of bad road conditions.

Further, the process of the insertion and the assembly of the friction plates 83, 85 in this embodiment will be described.

First of all, the nonmagnetic substance part 31A, 31C made of stainless steel is connected to the magnetic substance part 31B, 31D, 31E in the differential casing 31. At this time, the cover 34 is not attached to the differential casing 31 and the sun gear 53 and planet gear 43, 49 are not assembled. In this condition, the friction plates 83, 85 are inserted into the differential casing 31. At that time, the outer friction plates 83 first engage the tooth portion 36B of the magnetic substance part 31B and are inserted toward the left side in the figure in the axial direction along the tooth portion 36B. Then, the friction plates 83 once disengage from the tooth portion 36B at the aperture 36C, reengage the tooth portion 36A, are further inserted along the tooth portion 36A and are assembled in order from the left inner part.

Because the aperture 36C is provided in the differential casing 31 described above, even if the joint between the nonmagnetic substance part 31A and the magnetic substance part 31B is not precise and the tooth portion 36A deviates from the tooth portion 36B in the peripheral direction, the friction plates 83 are not caught in the deviating portion and can be easily inserted into the tooth portion 36A. Consequently, precise joint as required in a conventional device is unnecessary and the joint operation becomes easy so that the assembly operation can be improved.

In addition, in the above embodiment the present invention is applied to the center differential device for the vehicle with four-wheel drive, but this invention may be applied to the front differential device and/or the rear differential device.

What is claimed is:

1. A differential gear device for a vehicle comprising:

(a) a planetary gearing for producing a differential motion, including a ring gear with a tooth portion; and (b) an electro-magnetic multiple disc clutch for limiting the differential motion between a first and second output of said differential gear device, including (1) a plurality of outer friction plates having radially outwardly extending teeth, (2) a plurality of inner friction plates alternatively positioned with said outer friction plates, (3) an outer rotary member made of a nonmagnetic substance, integrally joined to said ring gear and provided with a tooth portion for engaging said radially outwardly extending teeth of said outer friction plates, said tooth portion of said outer rotary member being formed so as to receive said teeth of said outer friction plates from said tooth portion side of said ring gear and having an aperture at least larger than a thickness of one outer friction plate at said tooth portion of said ring gear to allow insertion and rotation of said outer friction plates in the aperature between said tooth portion of said outer rotary member and said tooth portion of said ring gear, (4) an inner rotary member with a tooth portion for engaging said inner friction plates; and (5) an electromagnet for causing frictional engagement of said outer and inner friction plates to limit the differential motion between said first and second outputs.

2. The differential gear device for a vehicle of claim 1, wherein said planetary gearing comprises a sun gear, planet gears and planet carrier; said differential gear device further comprises a multiple disc clutch for limiting a differential motion between said sun gear and said carrier, a cam structure for producing a thrust force to engage said multiple disc clutch by a differential motion between said outer rotary member and said inner rotary member when said electro-magnetic multiple disc clutch is engaged, said cam structure including a cam ring as said inner rotary member.

3. The differential gear device for a vehicle of claim 2, wherein said sun gear is connected to rear axles to drive rear wheels, and said planet carrier is connected to front axles to drive front wheels.

4. The differential gear device for a vehicle of claim 1 wherein said first output is connected to front axles to drive front wheels, and said second output is connected to rear axles to drive rear wheels.

* * * * *